Feb. 28, 1961   G. SELWOOD ET AL   2,973,014
FLUID CONTROL VALVES HAVING ANGULARLY MOVABLE
PARTS WITHIN PORTED HOLLOW BODIES
Filed Nov. 23, 1959

Inventor
G. Selwood
By Glascock Downing Seebold
Attys

United States Patent Office 2,973,014
Patented Feb. 28, 1961

2,973,014

FLUID CONTROL VALVES HAVING ANGULARLY MOVABLE PARTS WITHIN PORTED HOLLOW BODIES

George Selwood, Taunton, Somerset, and John Wesley, Burnham-on-Sea, England, assignors to Wilmot-Breeden Limited, Somerset, England Filed Nov. 23, 1959, Ser. No. 854,914
Claims priority, application Great Britain Nov. 27, 1958
1 Claim. (Cl. 137—624)

This invention relates to fluid control valves of the kind comprising a valve member of circular cross-section which is mounted within a valve body for angular movement about its central axis, and which has formed therein at least one passage or groove which can be brought into register with ports formed in the valve body adjacent the end faces of the member.

The object of the invention is to provide a valve of such a kind in a convenient form.

According to the invention in a valve of the kind specified the member is located for said angular movement by means of anti-friction ball or roller bearings, and has its faces adjacent the ports accurately formed to provide a predetermined clearance between them and the valve body.

Figure 1:
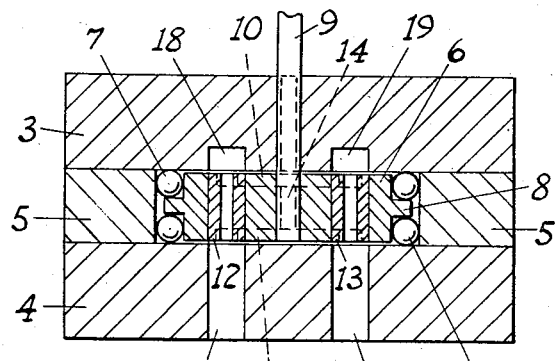
Figure 2:
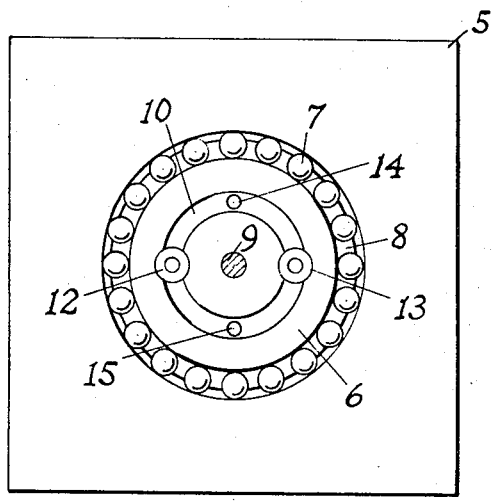

An example of the invention is illustrated in the accompanying drawings, in which Figure 1 is a part sectional view and Figure 2 is a plan with the upper part of the body removed.

Referring to the drawings, the valve body may include a pair of separately formed end parts 3, 4 interconnected by an intermediate part 5 so that their presented faces, which are accurately machined, are in parallel spaced relationship. Between parts 3, 4 is mounted a substantially cylindrical valve member 6, the end faces of which are also accurately machined to be at right angles to its axis and to provide a small predetermined clearance between its ends and the two parts 3, 4 of the valve body.

The valve member is located for angular movement about its central axis within the valve body by means of an anti-friction bearing in the form of two annular rows of balls 7 supported in apertures which are defined respectively by the member 6, an annular rib 8 formed thereon and the parts 3, 5, and by the member 6, rib 8 and parts 4, 5. Moreover, for moving the member 6 angularly there is provided a spindle 9 extending through the part 3.

Within the faces of the member 6 presented to the parts 3, 4 is formed a pair of annular grooves 10, 11 each of which is divided into two arcuate portions by annular sleeves 12, 13 accommodated within the passages in the member 6. Moreover, corresponding arcuate portions of the grooves 10, 11 are in communication through passages 14, 15 respectively.

In the part 3 are formed an inlet port and an outlet port (not shown) which are in communication respectively with the two arcuate portions of the groove 10, containing the passages 14, 15 respectively, whilst in the part 4 is formed a pair of ports 16, 17 which communicate with the two arcuate portions of the groove 11 respectively except when such communication is blocked by the sleeves 12, 13. Further, a pair of bores 18, 19 are formed in the part 3 in alignment with the ports 16, 17 respectively, the purpose of these bores being to equalise the pressures and flows on opposite faces of the member 6.

The arrangement is such that when the valve is in the position shown in the drawings no flow takes place to either of the ports 16, 17. However, if the member 6 is moved clockwise as seen in Figure 2 fluid flows from the inlet through the parts of grooves 10 and 11 connected by the passage 14 to the port 17 which is in communication with, for example, a reversible motor. The exhaust from the motor flows through the port 16 and the parts of grooves 10 and 11 connected by the passage 15 to the outlet. When the member 6 is moved anti-clockwise as seen in Figure 2 the flow will be through the grooves 10 and 11 and the port 16 to drive the motor in the opposite direction. In this case the exhaust will be through the port 17 and the opposite sections of grooves 10, 11 to the outlet.

By the present invention it is possible to provide a valve for controlling fluid at pressures which are high relative to the power available for imparting angular movement to the valve member.

Having thus described our invention what we claim as new and desire to secure by Letters Patent is:

A fluid control valve of the kind specified, comprising in combination a hollow body provided with inlet and outlet ports, and with a pair of parallel internal surfaces in spaced relationship, a circular member which has formed therein at least one passage, and which is mounted within the hollow body between the said parallel internal surfaces thereof so as to be movable about a central axis for controlling fluid flow through the inlet and outlet ports, an actuating spindle secured at one end to the circular member in coaxial relationship thereto, and extending through one side of the hollow body, the circular member having a pair of parallel faces separated from the said parallel internal surfaces of the hollow body by small predetermined clearances, and two annular rows of anti-friction bearing members situated within the hollow body between, and in contact with, the circular member and the said parallel internal surfaces of the hollow body to support the circular member and maintain the small predetermined clearances between the parallel faces of the circular member and the said parallel internal surfaces of the hollow body.

References Cited in the file of this patent

UNITED STATES PATENTS

| | | |
|---|---|---|
| 1,960,515 | Shield | May 29, 1934 |
| 2,202,961 | Parker | June 4, 1940 |
| 2,312,941 | Tucker | Mar. 2, 1943 |
| 2,349,641 | Tucker | May 23, 1944 |
| 2,696,219 | Barksdale | Dec. 7, 1954 |
| 2,892,450 | Hogan | June 30, 1959 |

FOREIGN PATENTS

| | | |
|---|---|---|
| 174,255 | Great Britain | Jan. 26, 1922 |